United States Patent
Warke et al.

(10) Patent No.: US 10,908,287 B2
(45) Date of Patent: Feb. 2, 2021

(54) METHODS AND APPARATUS FOR LIDAR OPERATION WITH NARROWBAND INTENSITY MODULATION

(71) Applicant: Texas Instruments Incorporated, Dallas, TX (US)

(72) Inventors: Nirmal C. Warke, Saratoga, CA (US); David P. Magee, Allen, TX (US); Baher S. Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 496 days.

(21) Appl. No.: 15/396,457

(22) Filed: Dec. 31, 2016

(65) Prior Publication Data
US 2017/0329011 A1 Nov. 16, 2017

Related U.S. Application Data

(60) Provisional application No. 62/334,098, filed on May 10, 2016.

(51) Int. Cl.
*G01S 17/32* (2020.01)
*G01S 7/487* (2006.01)
(Continued)

(52) U.S. Cl.
CPC .............. *G01S 17/32* (2013.01); *G01S 7/484* (2013.01); *G01S 7/487* (2013.01); *G01S 7/4911* (2013.01); *G01S 17/10* (2013.01); *G01S 17/42* (2013.01)

(58) Field of Classification Search
CPC .......... G01S 17/32; G01S 17/10; G01S 17/42; G01S 7/484; G01S 7/487; G01S 7/4911
See application file for complete search history.

(56) References Cited

U.S. PATENT DOCUMENTS 5,742,379 A * 4/1998 Reifer .................. G01S 7/4865
 356/5.07
5,745,437 A * 4/1998 Wachter ................. G01S 17/10
 342/127

(Continued)

FOREIGN PATENT DOCUMENTS

| EP | 1055941 | 11/2000 |
| EP | 2963445 | 6/2016 |

OTHER PUBLICATIONS

International Search Report in corresponding PCT Patent Application No. PCT/US2017/031994, dated Aug. 14, 2017 (2 pages).

(Continued)

*Primary Examiner* — Eric L Bolda
(74) *Attorney, Agent, or Firm* — Ray A. King; Charles A. Brill; Frank D. Cimino

(57) ABSTRACT

In described examples, an integrated circuit includes a modulator configured to modulate a driving signal for an optical transmitter with a narrow band modulation signal in which the driving signal with a fixed duration is transmitted to the optical transmitter periodically. The integrated circuit also includes a demodulator configured to receive a signal from an optical receiver that is configured to receive a reflection of light transmitted by the optical transmitter off an object, the demodulator configured to discriminate the narrow band modulation signal and estimate a distance of the object using the narrow band modulation signal.

10 Claims, 4 Drawing Sheets

(51) Int. Cl.
*G01S 17/42* (2006.01)
*G01S 17/10* (2020.01)
*G01S 7/484* (2006.01)
*G01S 7/4911* (2020.01)

(56) References Cited

U.S. PATENT DOCUMENTS

| | | | | |
|---|---|---|---|---|
| 5,784,023 | A * | 7/1998 | Bluege | G01S 7/4815 |
| | | | | 342/104 |
| 5,889,490 | A * | 3/1999 | Wachter | G01S 17/10 |
| | | | | 342/127 |
| 6,369,880 | B1 | 4/2002 | Steinlechner | |
| 7,262,402 | B2 | 8/2007 | Niclass et al. | |
| 7,512,237 | B1 | 3/2009 | Schantz et al. | |
| 7,701,559 | B2 * | 4/2010 | Bridges | G01B 11/024 |
| | | | | 356/4.01 |
| 2004/0105087 | A1 * | 6/2004 | Gogolla | G01S 7/497 |
| | | | | 356/3 |
| 2009/0059201 | A1 | 3/2009 | Willner et al. | |
| 2010/0027602 | A1 | 2/2010 | Abshire et al. | |
| 2016/0003946 | A1 * | 1/2016 | Gilliland | G01S 17/10 |
| | | | | 356/5.01 |
| 2016/0025843 | A1 * | 1/2016 | Sebastian | G01S 7/4814 |
| | | | | 356/4.01 |
| 2016/0231420 | A1 | 8/2016 | Kryvobok | |
| 2017/0082737 | A1 | 3/2017 | Slobodyanyuk et al. | |

OTHER PUBLICATIONS

"Chung et al., "Optical Orthogonal Codes: Design, Analysis, and Applications," IEEE Trans on Information Theory, vol. 35. No. 3, May 1989, IEEE, 445 Hoes Lane, Piscataway, NJ 08854-4141 USA; accessed Apr. 11, 2017 http://www.math.ucsd.edu/~fan/mypaps/fanpap/97_opticalorthocodes.pdf".

E.P. Baltsavias, "Airbone laser scanning: basic relations and formulas" ISPRS J Photogramm Remote Sens (1999) 54:199-214. doi:10.1016/S0924-2716(99)00015-5 Elsevier B.V., Radarweg 29, 1043 NX Amsterdam, The Netherlands, accessed, Dec. 31, 2016, http://www2.geog.ucl.ac.uk/~mdisney/teaching/teachingNEW/PPRS/papers/Baltsavias_Lidar.pdf.

* cited by examiner

METHODS AND APPARATUS FOR LIDAR OPERATION WITH NARROWBAND INTENSITY MODULATION

CROSS-REFERENCE TO RELATED APPLICATIONS

This application claims the benefit under 35 U.S.C. § 119(e) to co-owned U.S. Provisional Patent Application Ser. No. 62/334,098, filed May 10, 2016, entitled "Method for Interference Free LIDAR Operation with Narrowband Intensity Modulation," naming Warke, et. al. as inventors, which is hereby incorporated by reference in its entirety herein. In addition, this application is related to co-owned U.S. Provisional Application Ser. No. 62/334,107, entitled "Method for Interference Free LIDAR operation with Pulse Position Modulation," filed May 10, 2016, naming Warke, et. al. as inventors, and to co-owned U.S. Provisional Application Ser. No. 62/334,117, entitled "Method for Interference Free LIDAR Operation with Sequencing Pulses," filed May 10, 2016, naming Warke, et. al. as inventors, which applications are each hereby incorporated by reference in its entirety herein.

TECHNICAL FIELD

This application relates generally to lidar, and, in particular, to preventing interference between lidar devices.

BACKGROUND

Lidar is a ranging technology used to estimate distance to a target based on transmitting light energy. Typical lidar systems operate by reflecting a transmitted narrow pulse of light off of a target and estimating the amount of time it takes the pulse to return. An alternative approach is amplitude modulated continuous wave (AMCW) based lidar. In AMCW lidar, the transmitter modulates the intensity of the light with a continuous wave (CW) signal. The receiver typically estimates the time of flight based on the phase of the received CW signal relative to the transmitted CW signal.

As noted hereinabove, lidar (also called LIDAR, LiDAR, and LADAR) is a method for measuring distance to a target by illuminating that target with a laser light. The name lidar is sometimes considered an acronym of Light Detection And Ranging (i.e. LiDAR) or Light Imaging, Detection, And Ranging (i.e. LIDAR). Lidar was originally a portmanteau of the words "light" and "radar." In lidar systems, a source transmits light into a field of view and the light reflects off objects. Sensors receive the reflected light. In some lidar systems, a flash of light illuminates an entire scene. In the flash lidar systems, arrays of time-gated photodetectors receive reflections from objects illuminated by the light, and the time it takes for the reflections to arrive at various sensors in the array is determined. In an alternative approach, a scan such as a raster scan can illuminate a scene in a continuous scan fashion. A source transmits light or light pulses during the scan. Sensors that can also scan the pattern, or fixed sensors directed towards the field of view, receive reflective pulses from objects illuminated by the light. The light can be a scanned beam or moving spot. Time-of-flight computations can determine the distance from the transmitter to objects in the field of view that reflect the light. The time-of-flight computations can create distance and depth maps. Light scanning and lidar applications include: ranging; metrology; mapping; surveying; navigation; microscopy; spectroscopy; object scanning; and industrial automation. Recently, lidar applications also include: security; robotics; and mobile systems. Vehicles use lidar navigation and collision avoidance systems. Autonomous vehicles and mobile robots use lidar for collision avoidance and scene detection.

Lidar systems operating in the same environment may interfere with one another, as there is no way for each lidar to discriminate its return signal from that of other lidars. In industrial environments, more than one robot or other device may be employing lidar, and in automotive applications other vehicles may be using lidar in the same area. Interference between lidars can result in erroneous operation. In safety critical applications, such as automotive or industrial applications, this type of operational malfunction is not acceptable.

SUMMARY

In accordance with a described example, an integrated circuit includes a modulator configured to modulate a driving signal for an optical transmitter with a narrow band modulation signal in which the driving signal with a duration is transmitted to the optical transmitter periodically. The integrated circuit includes a demodulator configured to receive a signal from an optical receiver that is configured to receive the reflection of light transmitted by the optical transmitter off an object, the demodulator configured to discriminate the narrow band modulation signal and estimate a distance of the object using the narrow band modulation signal.

DETAILED DESCRIPTION OF EXAMPLE EMBODIMENTS

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figure 1:
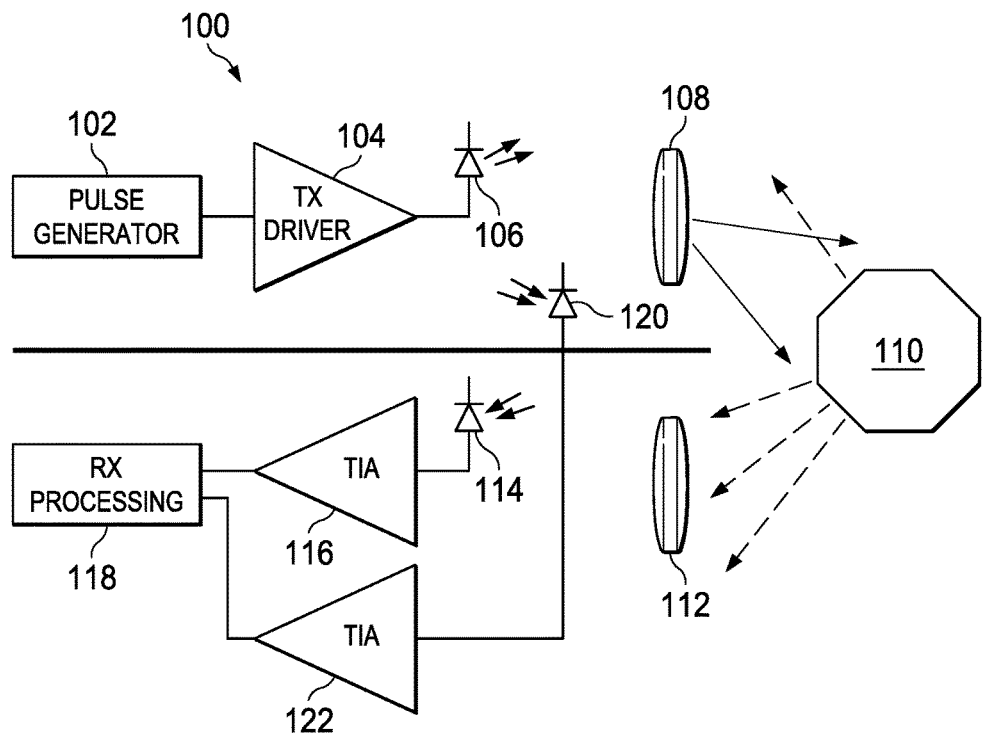
FIG. 1 is a schematic diagram of a pulse-type lidar.

FIG. 1 is a schematic diagram of a pulse-type lidar. Lidar 100 includes pulse generator 102, which provides timed pulses to transmit driver 104. Transmit driver 104 drives laser diode 106. Optics 108 collimates and directs the pulsed light onto a field of view that includes object 110. Optics 108 may be a fixed lens system or one of many mechanisms for scanning the light signal across a scene. Object 110 reflects and scatters the light signal. Optics 112 receives a portion of the reflected light signal and focuses it on photodiode 114. Trans-impedance amplifier (TIA) 116 amplifies the output of photodiode 114 and provides the amplified signal to receive processing unit 118. In some configurations, a photodiode 120 is positioned to receive a portion of the light signal directly from laser diode 106. TIA 122 amplifies the output of photodiode 120 and provides the output to receive processing unit 118. Receive processing unit 118 includes analog-to-digital converters (ADCs, not shown) that convert the signals received from TIA 116 and TIA 122 to digital format for further processing as described hereinbelow regarding FIG. 2.

Figure 2:
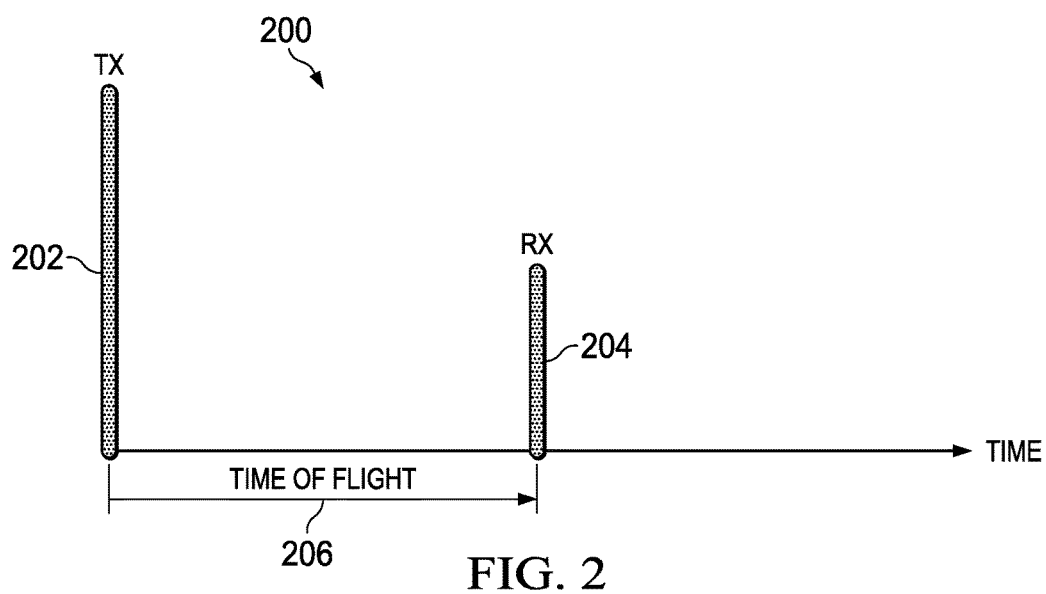
FIG. 2 is a graph showing the operation of the lidar of FIG. 1.

FIG. 2 is a graph showing the operation of lidar 100 of FIG. 1. Graph 200 shows transmit pulse 202 at a first time followed by receive pulse 204. The speed of light is known, so the distance of object 110 (FIG. 1) can be estimated using time of flight 206. That is, the distance is estimated as given in Equation 1:

$$d=(c*t_{TOF})/2 \qquad (1)$$

Where: d is the distance, c is the speed of light and $t_{TOF}$ is the time of flight. The speed of light times the time of flight is halved to account for the travel of the light pulse to, and from, the object.

Receive pulse 204 has significantly smaller amplitude than transmit pulse 202. The difference between the amplitudes of the transmit and receive pulse in a real-life application is much greater than shown in FIG. 2. The reduced amplitude in the received pulse is caused by scattering and absorption and divergence of the transmitted light. Therefore, it is sometimes difficult to discriminate between the receive pulse 204 and noise. In addition, the losses during flight make it necessary to use powerful lasers to ensure that the receiving photodiode receives a receive pulse of adequate amplitude.

Figure 3:
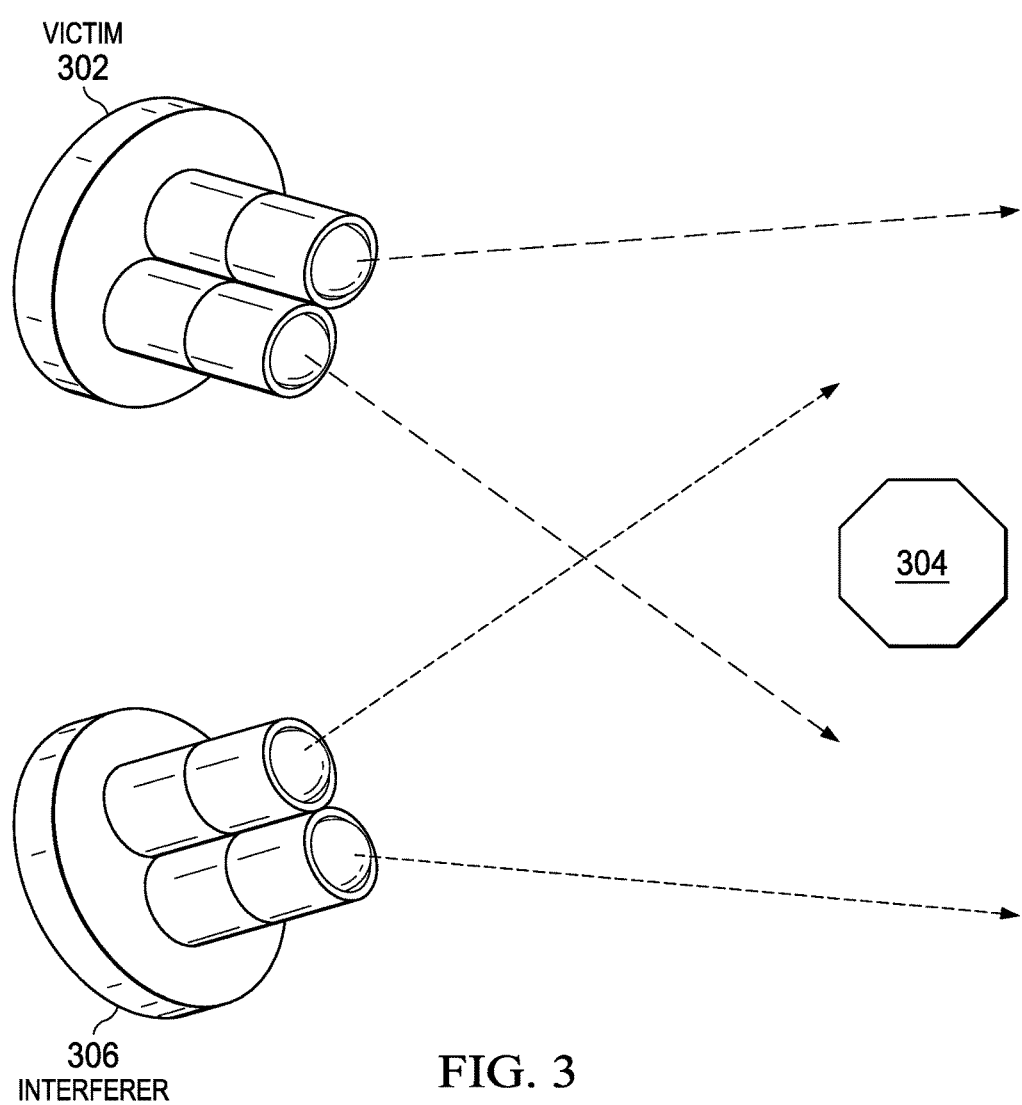
FIG. 3 illustrates an additional problem with the device of FIG. 1.

FIG. 3 illustrates an additional problem with the device of FIG. 1. If multiple lidars are operating in the same environment, it is not possible to discriminate between an intended return pulse (like receive pulse 204, FIG. 2) and a return pulse from another lidar. For example, victim lidar 302 is attempting to range object 304. However, interferer lidar 306 is also attempting to range object 304. Victim lidar 302 has no way to determine that a received pulse is a return from the pulse transmitted by itself or is a return from interferer lidar 306. A time of flight calculated from any input other than the proper receive pulse produces an erroneous distance estimate.

Figure 4:
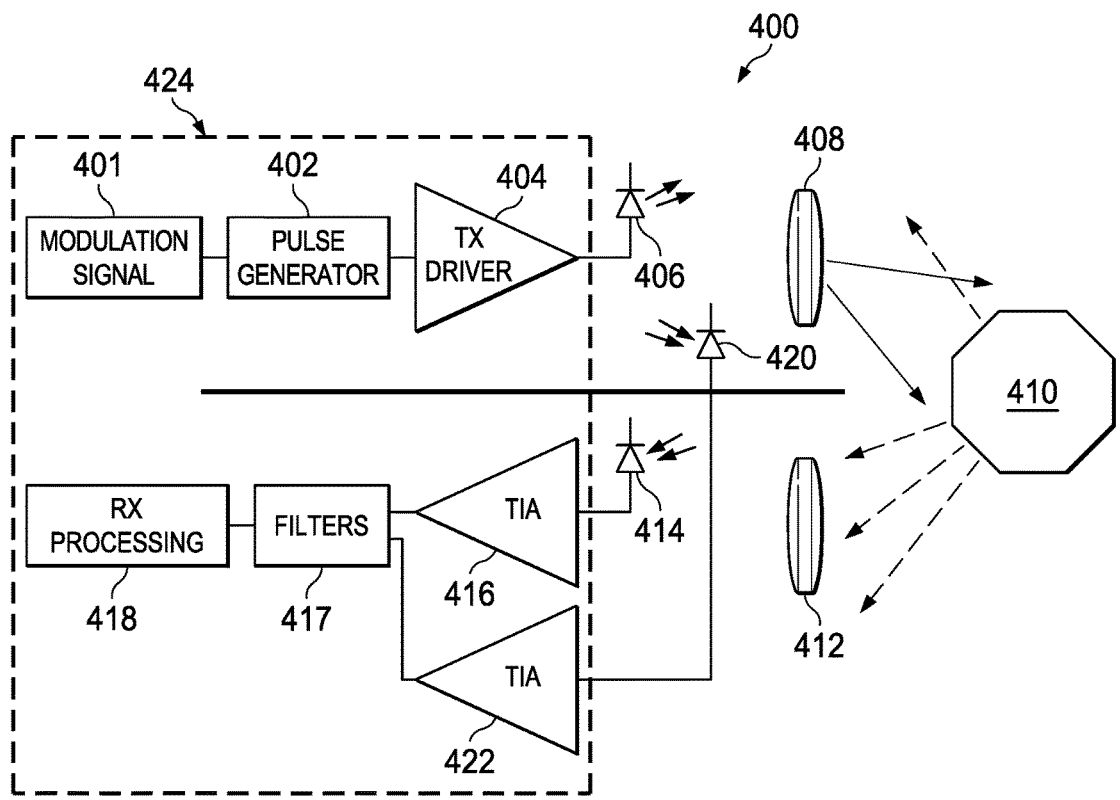
FIG. 4 is a schematic diagram of an embodiment for a lidar system.

FIG. 4 is a schematic diagram of an embodiment for a lidar system. Lidar 400 includes a pulse generator 402 which generates pulse sequences using the signal for the modulation signal generator 401. The modulated pulse drives transmit driver 404, which generates a driving signal to drive an optical transmitter such as a laser diode 406. The modulation signal, which may be a narrow band modulation signal, modulates the intensity of the light transmitted by laser diode 406 during the pulse. Pulse generator 402 serves as a pulse sequence generator using the modulation signal as a reference. Optics 408 directs the modulated light signal to a field of view that includes object 410. Optics 408 may be a fixed lens system or one of many mechanisms for scanning the light signal across a scene.

Optics 412 focuses a reflection of the modulated signal reflected by object 410 on to photodiode 414. In addition, the optional photodiode 420 receives a reference modulated signal directly from laser diode 406. TIAs 416 and 422 amplify the light signals received by photodiodes 414 and 420, respectively, and provide these signals to filters 417. Filters 417 may apply a single filter or multiple filters to each of the signals provided by TIAs 416 and 422. In an example embodiment, filters 417 apply the same filters to the light signals provided by TIAs 416 and 422. This filtering allows a receive processor to factor out common delays and non-linearities by comparing the two signals. As described in more detail herein below, filters 417 filter out signals except for the modulated signals. Therefore, filters 417 diminish the effect of noise and interferers. This selective filtering allows receive processor 418 to correctly estimate the distance of object 410. In another aspect of the embodiments, the filters within filters 417 include narrow band-pass filters.

Among other functions, receive processor 418 and filters 417 serve as a demodulator of the filtered light signals received from TIAs 416 and 422. In an aspect of the embodiments, transmit driver 404 provides a signal to receive processor 418 to indicate when transmit driver 404 transmits a pulse. Modulation signal generator 401, transmit driver 404, receive processor 418, filters 417 and TIAs 416 and 422 may partially or wholly incorporated into an integrated circuit as indicated by group 424. For example, an integrated circuit may generate the signals and apply the signals to laser diode 406 using one or more power transistors or power modules. Transmit driver 404 may be implemented using discrete components or using several components incorporated into a module. In some configurations, one integrated circuit may drive multiple laser diodes. In other configurations, a separate circuit drives each of multiple laser diodes and a common receive processor 418 analyzes the signals. The receive processor 418 and filters 417 may include a digital signal processor (DSP), a CPU, a RISC core such as an ARM core, a mixed signal processor (MSP) or another suitable processor.

In an example embodiment operated with a reference photodiode such as 420 in FIG. 4, the receive processor such as 418 in FIG. 4 can perform a correlation function using the reference signal and the received modulated signal. A peak in the correlation function will correspond to the time delay of the received signal. Equation 1 can then be used to estimate the distance. In another alternative embodiment, an FFT can be performed in receive processor 418 on the received signal, and a phase of the tone can be used to estimate the delay in the received signal, Equation 1 can then be used to calculate the distance.

Figure 5:
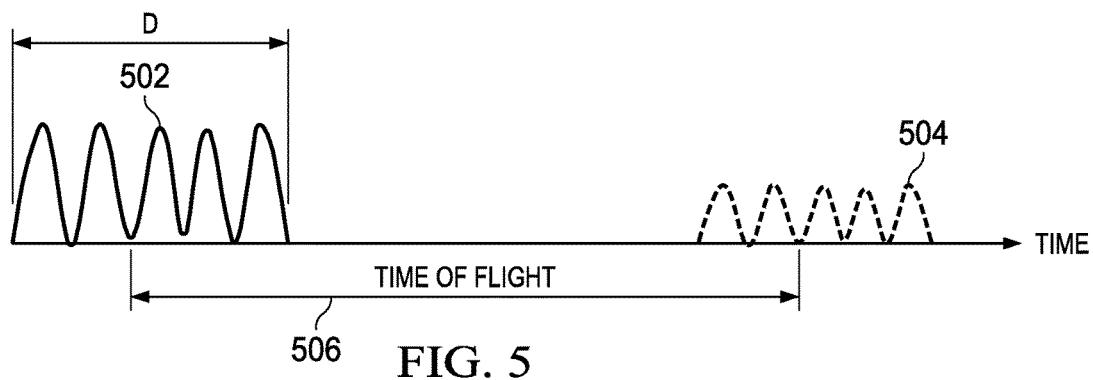
FIG. 5 is a graph showing modulated signals.

FIG. 5 is a graph showing modulated signals. In FIG. 5, time is on the horizontal axis and amplitude is on the vertical axis. Transmit pulse 502 is a modulated pulse having a duration D. The modulation of transmit pulse 502 is a narrow band frequency. Receive signal 504 has the same duration and the same intensity modulation frequency.

Figure 6:
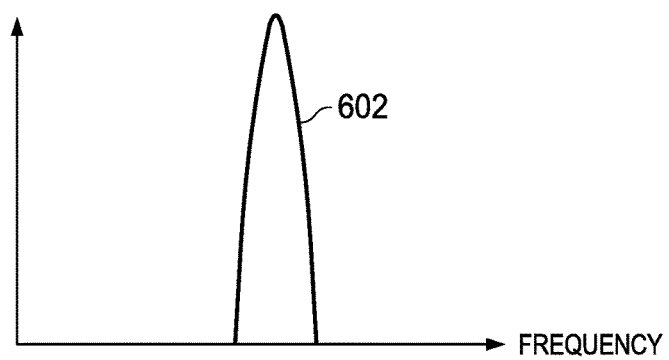
FIG. 6 is a frequency spectrum of a receive signal.

FIG. 6 is a frequency spectrum 602 of receive signal 504 (FIG. 5). This narrow spectrum allows for efficient filtering on a band including frequency spectrum 602, even though the use of a pulse configuration will generate harmonics. In an example embodiment, filters 417 (FIG. 4) are digital filters and the outputs of TIAs 416 and 422 (FIG. 4) are converted to digital signals before filtering. By filtering out all but the modulated receive signal 504, lidar 400 (FIG. 4) can accurately estimate the distance of object 410, even in the presence of interfering lidars. Lidar 400 can discriminate between transmitted signals and interferers and noise that might be received.

In addition, because the transmit energy of transmit pulse 502 is spread over multiple pulses within transmit pulse 502, the peak intensity transmitted by laser diode 406 can be lowered while still providing adequate energy in the receive signal 504 for photodiode 414 (FIG. 4) to accurately detect the received signal. The transmit waveform can be relatively long, for example, from 100 nsec to a few µsec. Because the waveform consists of multiple cycles of the modulation signal, the total transmit energy is divided amongst the multiple cycles resulting in lower peak transmit optical power. Thus, laser diode 406 and transmit driver 404 can be cheaper and more compact than in prior systems. In addition, photodiode 414 may be implemented using a PiN photodiode, avalanche photodiode (APD) or silicon photo-multiplier (SiPM). Further, by using different modulation frequencies, the transmit waveforms are unique for each lidar, enabling lidars to operate interference free in the same environment. For example, in an application where the embodiments of the present application may be applied, a warehouse or factory may have many robots and/or autonomous carts for transporting goods or parts. If these robots and/or carts include lidar for collision avoidance or navigation, a different modulation frequency can be assigned to each device. Therefore, in this example, the lidar in one cart will not disrupt the operation of the lidar in another cart.

Figure 7:
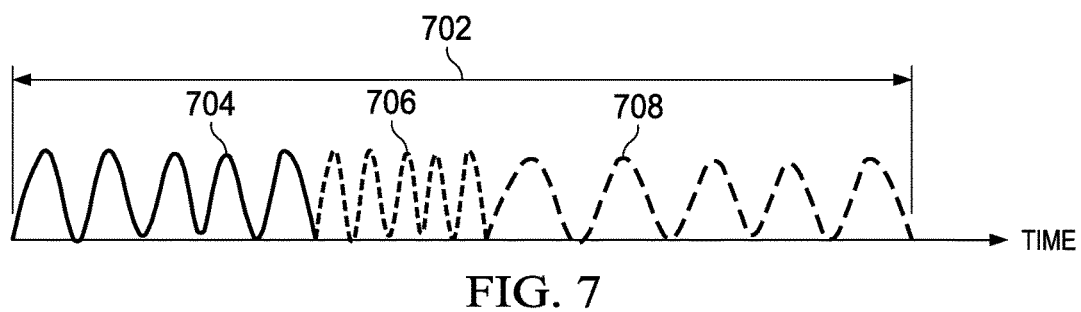
FIG. 7 is a graph of an example multiple tone modulated signal.

There are several possible variations of modulation waveforms that modulation signal generator 401 (FIG. 4) might produce. For example, a single tone, e.g. 50 MHz, modulates transmit pulse 502 (FIG. 5). In other examples, multiple tones may be used either simultaneously or sequentially. A pulse repetition modulation with a pulse repetition frequency (PRF) can be used. For example, a chirp signal may be used. In a chirp signal, modulation signal generator 401 (FIG. 4) varies the frequency of the modulation signal in a period sequence of tones. An example chirp sequence is a sequence of multiple monotonic tones, e.g. 5 cycles of 50 MHz interleaved with 5 cycles of 60 MHz. Another example is a saw tooth frequency ramp. With chirp sequences, it may be possible to accurately detect the return signal even if there is interference on one of the frequencies within the chirp. Another example is frequency hopping spread spectrum (FHSS). In FHSS, the modulation signal can be a pseudo-random sequence of tones also known as frequency hopping, e.g. 5 cycles of 50 MHz, 5 cycles of 60 MHz, 5 cycles of 45 MHz, 5 cycles of 55 MHz, etc. FHSS has the advantage that no mechanism is needed to coordinate between multiple lidars in an environment because of the low probability that two lidars will use the same frequency and/or the same pseudo-random sequence. Receiving two FHSS receive pulses having the same frequency and sequence (a very rare event) indicates a conflict. In this circumstance, determination of an estimate is not possible. The FHSS signal will then hop to a new sequence/frequency combination for the next cycle. FIG. 7 is a graph of an example multiple tone modulated signal. Modulation signal 702 includes tone 704, tone 706 and tone 708, which all have different frequencies.

In an example embodiment, filters 417 (see FIG. 4) may include analog front end (AFE) elements such as analog filters. In this arrangement, receive processor 418 (FIG. 4) may include analog to digital converters (ADCs). In another additional embodiment, receive processor 418 (FIG. 4) may store the entire pulse as received by photodiode 420 (FIG. 4) for comparison to signals received on photodiode 414 (FIG. 4). In this example, the receive processor compares the stored pulse to the signals received on photodiode 414 (FIG. 4) and the best match indicates the time of flight 506 of the pulse. In a further example embodiment, the modulation signals may be selected to have a minimal cross correlation between each other. In this arrangement, a comparison between the transmit signal and a receive signal having a different modulation signal will provide a very low cross correlation signal. In contrast, a comparison between the modulation of a transmit signal and its' receive signal will have a very high auto correlation signal. This feature facilitates accurate estimation and allows for rejection of interfering signals (i.e. discrimination between the desired signal and interfering signals).

To avoid interference within an environment such as a factory or warehouse, each transmitter can use a different modulation frequency or modulation frequency sequence. Receive processor 418 uses a narrow bandpass filter or filters 417 so that only relevant signal components are processed by receive processor 418, effectively filtering out interference from other transmitters. The filters can be implemented in digital or analog form. In an embodiment, filters 417 includes digital filters, which allow for rapid changes in the bandpass frequencies, which facilitates the use of complex modulation signals. In another embodiment, multiple analog filters to filter each necessary frequency band. However, this aspect of the embodiments does not provide the level of flexibility available with digital filtering.

Figure 8:
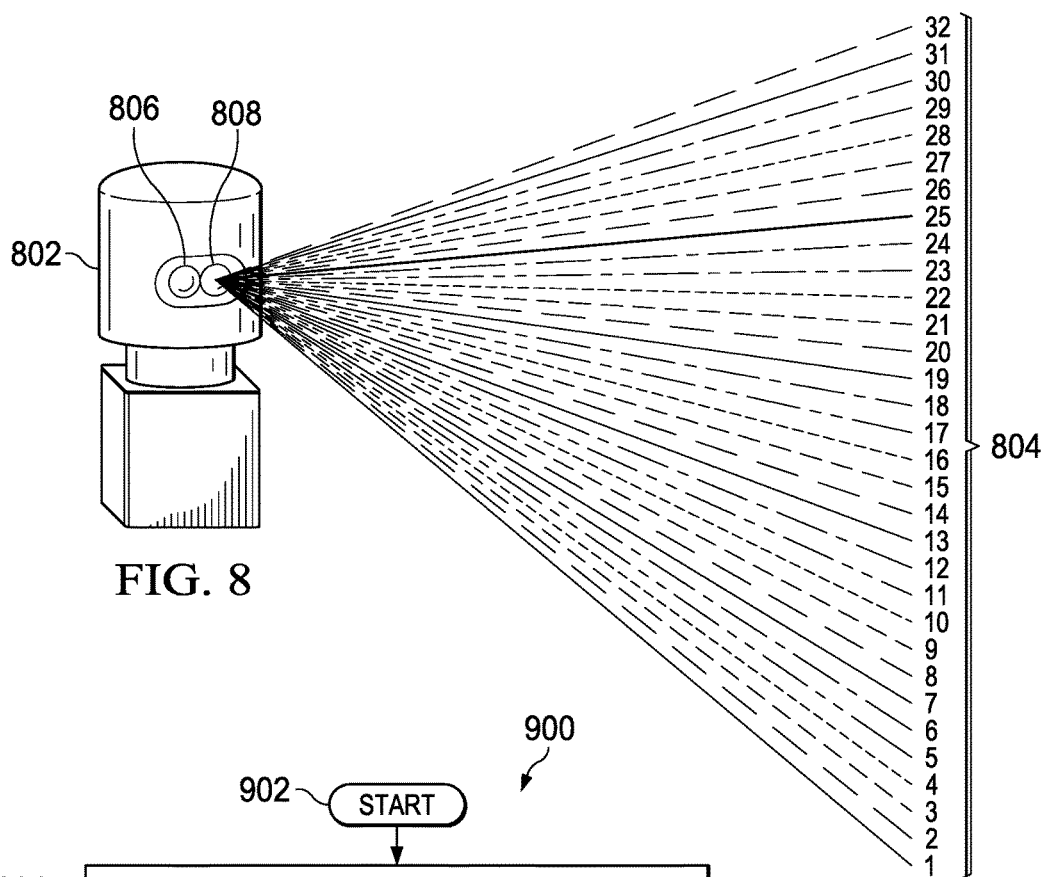
FIG. 8 is a drawing of a lidar device with scanning capabilities.

FIG. 8 is a drawing of a lidar device with scanning capabilities. Lidar scanner 802 includes transmitter 808 and receiver 806. The optics of transmitter 808 (not shown) allow the laser pulse to be directed in a plurality of beams 804. The optics may include movable mirrors, DMD devices, movable prisms or other beam direction devices. In other implementations, separate laser transmitters transmit each of beams 804. Lidars like lidar scanner 802 sometimes use rotating mounts to allow for scanning an entire scene.

Using a prior system like that of FIG. 1, each of the plurality of beams 804 must allow for the time of flight for the maximum range of the device. If a second transmission transmits before the return of the first transmission, the receiving photodiode may pick up a reflection of the second transmission or scatter from the second transmission. Either one could cause an erroneous distance estimate. Therefore, each subsequent transmission must delay until it is certain that such a conflict will not occur, i.e. the time of flight for the maximum range of the device. Using an embodiment like that of FIG. 4, a unique modulation signal can modulate each beam. Therefore, in another embodiment, a lidar such as lidar scanner 802 can transmit a subset or all of beams 804 simultaneously without interference between beams. This mode allows for much faster scanning, or for simultaneous transmission for configurations with separate lasers for each of beams 804.

Figure 9:
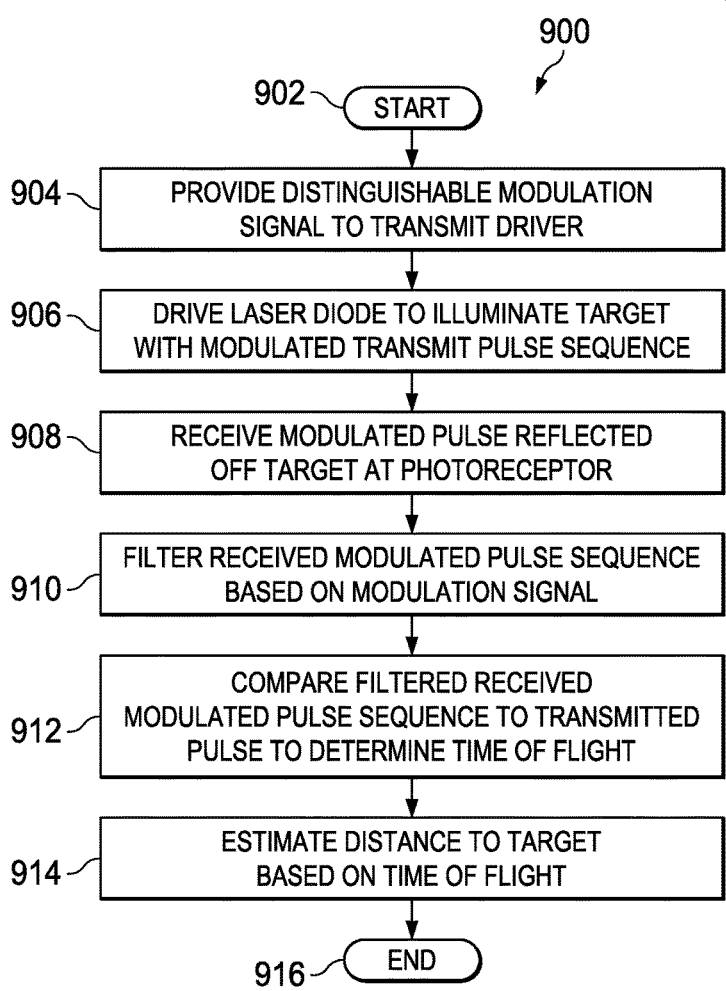
FIG. 9 is a flow diagram of a method embodiment.

FIG. 9 is a flow diagram of a method embodiment. Method 900 starts with step 902. Step 904 provides a distinguishable modulation signal (as described hereinabove) to the transmit driver (404, FIG. 4). Step 906 drives a laser diode (406, FIG. 4) to illuminate that target with a modulated pulse sequence. Step 908 receives the modulated pulse sequence reflected off the target. Step 910 filters the received pulse sequence to eliminate signals other than the modulated signal as much as possible. Step 912 compares the received signal to the transmitted signal to determine the time of flight. Step 914 estimates the distance of the object based on the time of flight. The method ends with step 916. In an alternative embodiment, the modulation of step 904 uses low cross correlation modulation signals. In this method, step 910 may or may not filter the received signal because the low cross correlation of the modulation signals provides a good SNR signal to determine the time of flight of the pulse.

In the description hereinabove, laser diodes transmit the pulse sequence. However, other laser devices and well-focused light sources may be used. In addition, in the description hereinabove, photodiodes receive the pulse sequence. However, other types of photoreceptors may be effectively used.

In an example embodiment, an integrated circuit includes a modulator configured to modulate a driving signal for an optical transmitter with a narrow band modulation signal in which the driving signal with a duration is transmitted to the optical transmitter periodically. The integrated circuit also includes a demodulator configured to receive a signal from an optical receiver that is configured to receive a reflection of light transmitted by the optical transmitter off an object, the demodulator configured to discriminate the narrow band modulation signal and estimate a distance of the object using the narrow band modulation signal.

In another example arrangement, the narrow band modulation signal is a single modulation tone.

In another example embodiment, the narrow band modulation signal is a pseudo-random sequence of tones.

In another example embodiment, the narrow band modulation signal is a monotonic sequence of tones.

In another example embodiment, the demodulator includes a narrow bandpass filter to discriminate the narrow band modulation signal.

In yet another example embodiment, the demodulator includes a plurality of bandpass filters to discriminate the narrow band modulation signals.

In another example arrangement, the narrow band modulation signal is a multiple tone signal and the demodulator using a narrow bandpass filter to discriminate the narrow band modulation signal.

In another example arrangement, the optical transmitter is a laser emitting device.

In another example arrangement, the optical receiver is a photodiode.

In yet another example embodiment, an optical ranging apparatus includes a modulator configured to modulate a driving signal with a narrow band modulation signal and with a duration; an optical transmitter coupled to receive the driving signal and emit a modulated light signal onto an object; an optical receiver configured to receive the modulated light signal after reflecting off the object; and a demodulator coupled to the optical receiver, the demodulator configured to discriminate the narrow band modulation signal and estimate a distance of the object using the narrow band modulation signal.

In another example arrangement, the narrow band modulation signal is a single modulation tone.

In another example arrangement, the narrow band modulation signal is a pseudo-random sequence of tones.

In another example embodiment, the narrow band modulation signal is a monotonic sequence of tones.

In yet another example arrangement, the demodulator includes a narrow bandpass filter to discriminate the narrow band modulation signal.

In yet another example embodiment, the demodulator includes a plurality of bandpass filters to discriminate the narrow band modulation signals.

In another example arrangement, the narrow band modulation signal is a multiple tone signal and the demodulator includes a narrow bandpass filter to discriminate the narrow band modulation signal.

In another example embodiment, the optical transmitter is a laser emitting device.

In another example arrangement, the optical receiver is a photodiode.

In yet another example embodiment, a method for operating an optical ranging apparatus including providing a narrow band modulation signal to a driver; driving an optical transmitter with a driving signal from the driver that is modulated with narrow band modulation signal, the optical transmitter emitting a modulated light signal; receiving a received modulated light signal at an optical receiver that is the modulate light signal reflected off an object to provide a received modulated signal; filtering the received modulated signal with a narrow bandpass filter to provide a filtered received modulated signal; and estimating a distance of the object from the optical ranging apparatus using the filtered received modulated signal.

In another example arrangement, filtering the received modulated signal and estimating a distance of the object includes receiving a reference signal and performing a correlation with the received modulated signal, a peak in the correlation corresponding to the time delay of the received modulated signal.

In another example embodiment, the narrow band modulation signal includes a plurality of tones.

Modifications are possible in the described embodiments, and other additional variations are possible that form additional embodiments within the scope of the claims.

What is claimed is:

1. An optical ranging apparatus comprising:
   a modulator that generates a driving signal with a narrow band modulation signal and with a fixed duration, the modulator having an output;
   an optical transmitter having an input coupled to the output of the modulator, and having an output configured to be coupled to a light source, wherein the light source emits a modulated light signal in response to a pulsed signal received from the output of the optical transmitter;
   a first optical receiver having an input configured to receive the modulated light signal, and having an output;
   a second optical receiver having an input configured to receive light from the modulated light signal reflecting off an object, and having an output; and
   a demodulator having a first input coupled to the output of the first optical receiver, a second input coupled to the output of the second optical receiver, and a third input coupled to the output of the optical transmitter and receiving the pulsed signal from the output of the optical transmitter, wherein the demodulator is configured to discriminate the narrow band modulation signal, perform a correlation function on the narrow band modulated signal and the output of the first optical receiver, determine the peak in the correlation function corresponding to a time delay, and use the time delay to estimate a distance from the object.

2. The optical ranging apparatus of claim 1 in which the narrow band modulation signal is a single modulation tone.

3. The optical ranging apparatus of claim 1 in which the narrow band modulation signal is a pseudo-random sequence of tones.

4. The optical ranging apparatus of claim 1 in which the narrow band modulation signal is a monotonic sequence of tones.

5. The optical ranging apparatus of claim 1 in which the demodulator includes a narrow bandpass filter to discriminate the narrow band modulation signal.

6. The optical ranging apparatus of claim 1 in which the demodulator includes a plurality of bandpass filters to discriminate the narrow band modulation signal.

7. The optical ranging apparatus of claim 1 in which the narrow band modulation signal is a multiple tone signal and the demodulator includes a narrow bandpass filter to discriminate the narrow band modulation signals.

8. The optical ranging apparatus of claim 1 in which the optical transmitter is a laser emitting device and the optical receiver is a photodiode.

9. A method for operating an optical ranging apparatus comprising:

provuding a narrow band modulation signal to a pulse generator to provide a pulsed modulated signal to a driver;

driving an optical transmitter using the pulsed modulated signal from the driver, the optical transmitter emitting a modulated light signal;

receiving the modulated light signal at a first optical receiver to provide a first received modulated signal;

receiving a modulated light signal reflected off an object at a second optical receiver to provide a second received modulated signal;

filtering the first and second received modulated signals with a narrow bandpass filter to provide a filtered received modulated signal;

receiving the pulsed modulated signal from the driver and the filtered first and second received modulated signals at a receive processor;

performing a correlation function on the filtered first and second received modulated signals, using the pulsed modulated signal as a time reference;

determining the peak in the correlation function, which corresponds to a time delay; and estimating a distance of the object from the optical ranging apparatus using the time delay.

10. The method for operating an optical ranging apparatus of claim 9 in which the narrow band modulation signal includes a plurality of tones.

* * * * *